Feb. 16, 1971 F. A. NELSON 3,564,398
MAGNETIC FIELD HOMOGENIZING COIL SETS HAVING SPATIAL INDEPENDENCE AND SPECTROMETER MEANS USING SAME
Original Filed Aug. 8, 1966
3 Sheets-Sheet 1
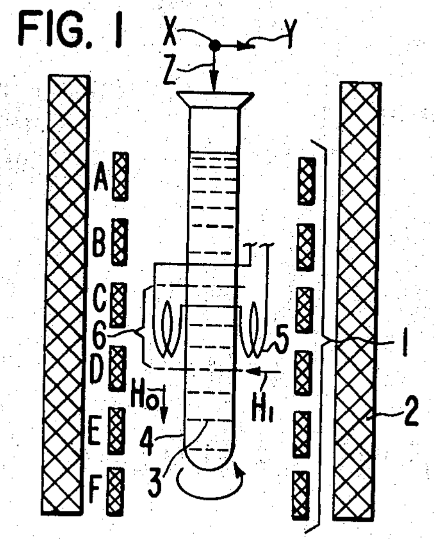
FIG. 1
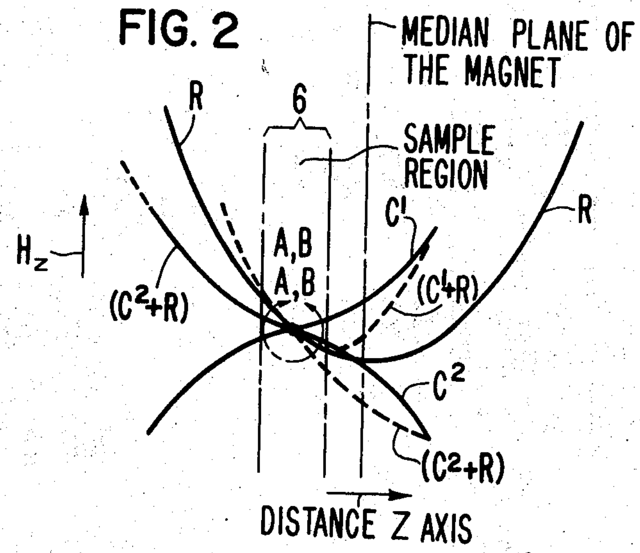
FIG. 2
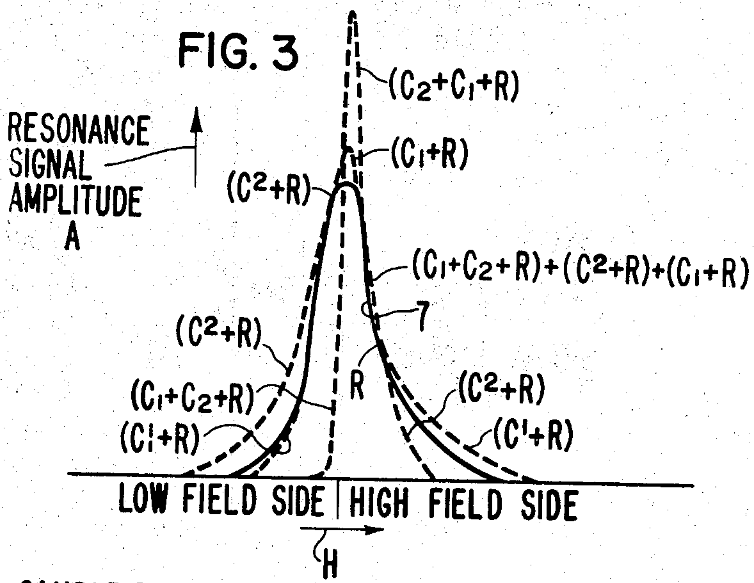
FIG. 3
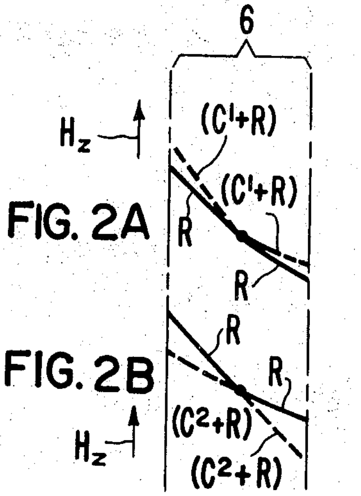
FIG. 2A
FIG. 2B
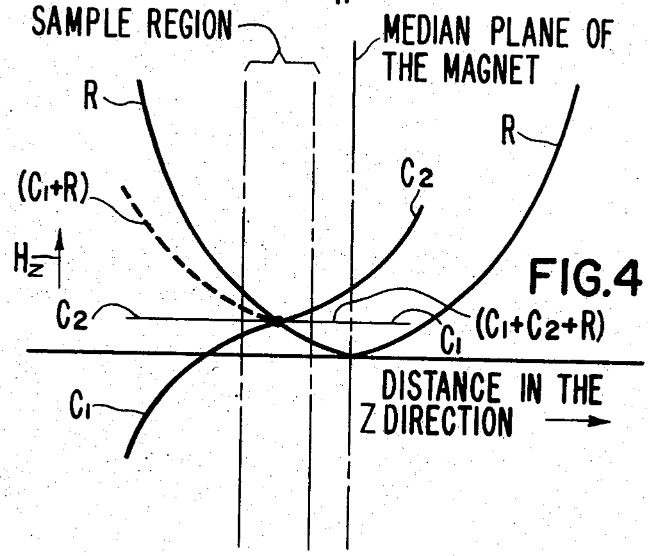
FIG. 4
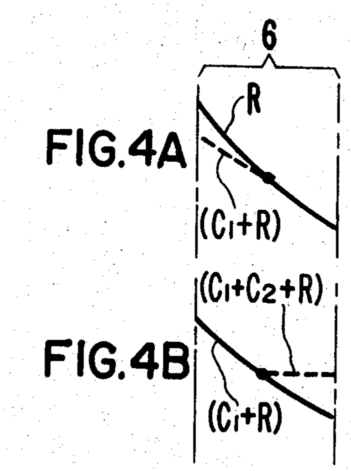
FIG. 4A
FIG. 4B
INVENTOR.
FORREST A. NELSON
BY [signature]
ATTORNEY INVENTOR.
FORREST A. NELSON
BY Wm [signature]
ATTORNEY INVENTOR.
FORREST A. NELSON
BY [signature]
ATTORNEY United States Patent Office 3,564,398
Patented Feb. 16, 1971

3,564,398

MAGNETIC FIELD HOMOGENIZING COIL SETS HAVING SPATIAL INDEPENDENCE AND SPECTROMETER MEANS USING SAME

Forrest A. Nelson, Palo Alto, Calif., assignor to Varian Associates, Palo Alto, Calif.

Continuation of application Ser. No. 571,096, Aug. 8, 1966. This application July 18, 1969, Ser. No. 846,643
Int. Cl. G01n 27/78
U.S. Cl. 324—0.5 4 Claims

ABSTRACT OF THE DISCLOSURE

Magnetic field homogenizing coil sets are provided wherein each coil set defines a geometrical configuration of current paths to be energized to produce separate asymmetric distributions of current relative to a certain region of magnetic field to be corrected. These asymmetric distributions of current produce separate homogenizing magnetic field gradient components which are substantially confined to separate portions of the region of field to be corrected for cancelling certain residual magnetic field inhomogeneities in the separate portions of the field to be corrected. In this manner, the field homogenizing gradient components are spatially independent to prevent mutual interference of their adjustment and whereby the adjustments produce unambiguous corrections of the field when sensed by gyromagnetic resonance of a sample within the region of field being corrected.

CROSS-RELATED CASES

Figures 5, 6, 7, 8, 9:
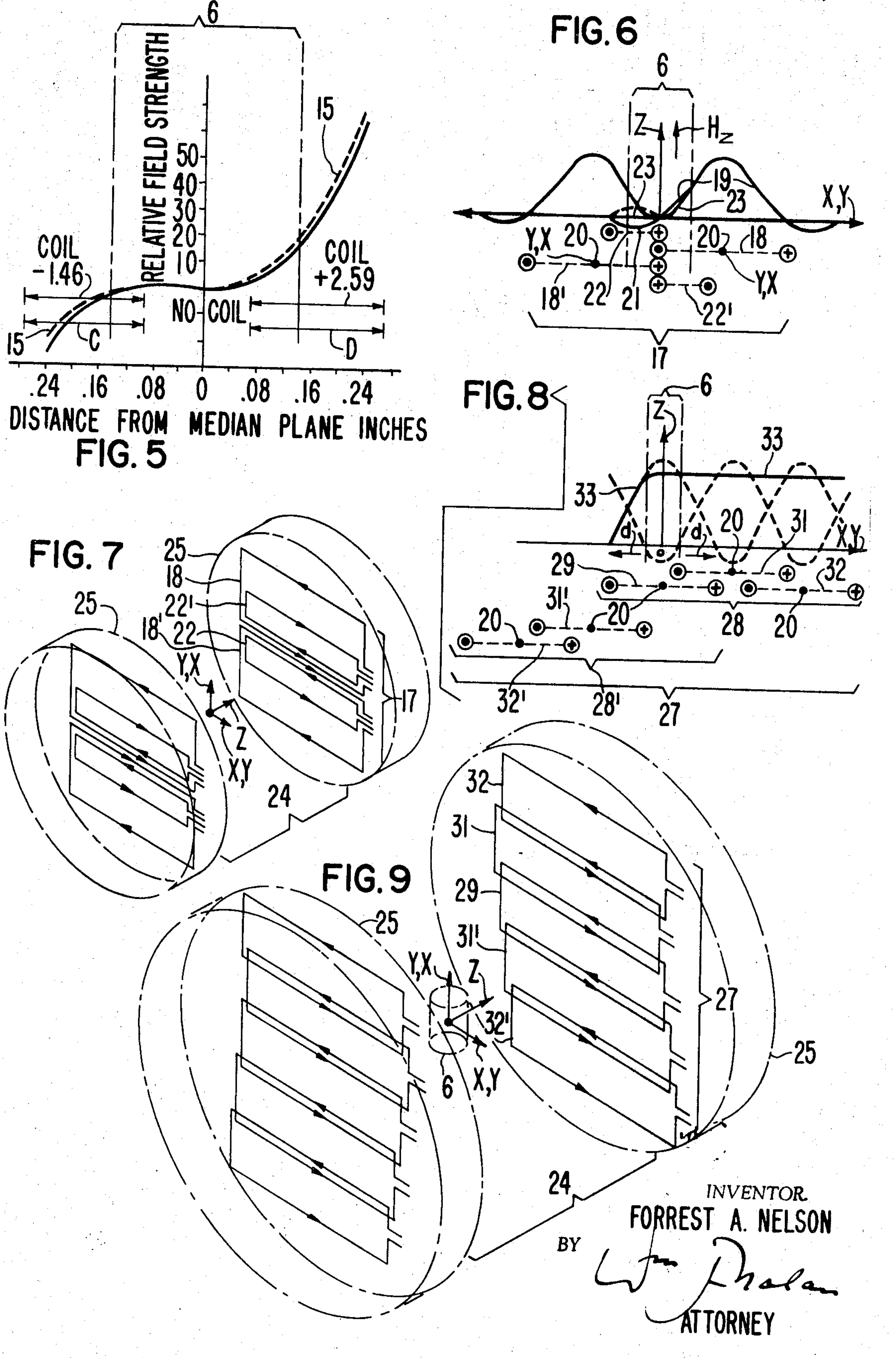

The present application is a continuation application of parent U.S. application 571,096 filed Aug. 8, 1966, and assigned to the same assignee as the present invention. The parent application has now become abandoned in favor of the present application.

DESCRIPTION OF THE PRIOR ART

Heretofore, gradient cancelling coil sets have been built and used in conjunction with gyromagnetic resonance spectrometers for cancelling undesired magnetic field gradients within the sample volume under analysis. Such coil sets are described and claimed in U.S. Pats. 2,858,504 issued Oct. 28, 1958; 3,199,021 issued Aug. 3, 1965, and patent application 348,442, filed Mar. 2, 1964 and assigned to the same assignee as the present invention. Typically, these coil sets have been symmetrically arranged with respect to the sample and energized to produce gradient field components which are symmetric or antisymmetric with respect to the sample volume within which they operate. This is done in order to produce one of the field corrective gradient components in pure form and to prevent producing other higher or lower order gradient components. The symmetric gradients introduce a fundamental field component within the sample which is typically cancelled out by an additional portion of the coil set. The fundamental field component would otherwise change the intensity of the fundamental (uniform) field intensity of the center of the sample and, thus, shift the gyromagnetic resonance frequency of the sample. Producing higher or lower order gradient components along with the intended component can produce an undesired mutual interaction between various coil sets producing such a common gradient component.

One of the problems with these prior coil sets which produce symmetrical or antisymmetrical gradient components relative to the sample is that certain residual gradients to be cancelled such as the second order (curvature), third order, etc., as centered about some other portion of the field other than the sample volume, are not antisymmetric or symmetric with respect to the center of the sample volume. Thus, when the symmetric or antisymmetric corrective gradient is applied to the sample it produces a field component which corrects the field over a certain portion of the sample on one side of the plane of symmetry and detracts from the field uniformity over another portion of the sample on the other side of the plane of symmetry. As a result, the observed gyromagnetic resonance signal line height may not increase or decrease with an adjustment of the corrective gradient component and it becomes very difficult for the operator to know how to adjust the current in this coil set for optimum field uniformity.

In the present invention, each coil set is arranged to produce its homogenizing field component only over a portion of the sample region being corrected. A second coil set is arranged to produce another field homogenizing component only over another region of the sample volume. In this manner, the ambiguity found in the prior symmetric coil sets is avoided such that a change in a homogenizing field component will always produce a change in the gyromagnetic resonance signal line height for the sample volume under observation. This comes about because the homogenizing field component is not adding to the field in one part of the sample and subtracting an equal amount from the field in another equally large portion of the sample. These spatially independently operating coil sets of the present invention, aside from removing the ambiguity of the field correction, are also mutually non-interfering in their adjustment because they operate on different regions of the sample volume. The spatially independently operating coil sets of the present invention are especially useful with an automatic field homogenizing system of the type as described and claimed in U.S. patent application 372,626, filed June 4, 1964, and assigned to the same assignee as the present invention. This comes about because the coils avoid the ambiguity of the field correction and, thus, use of these coils in an automatic system permits a more rapid convergence of the various field corrections to the optimum total field uniformity within the sample volume.

The principal object of the present invention is the provision of an improved set of magnetic field homogenizing coils and improved spectrometers using same.

One feature of the present invention is the provision of plural magnetic field homogenizing coil sets for producing a more uniform field within a region of field to be corrected and wherein the plural coil sets produce their respective homogenizing components only over separate asymmetric portions of the total region to be corrected, whereby a change in each of the applied homogenizing components produces an unambiguous change in the uniformity of the field over the sample volume, and whereby said components are substantially non-interfering due to their spatial independence.

Another feature of the present invention is the same as the preceding feature wherein each of the coil sets which produces the spatially independent homogenizing field components is also arranged and energized such as not to substantially change the intensity of the uniform field over the other regions of the field which are to be corrected by the other coil set or sets, whereby the total uniform field intensity is not changed over the sample volume with adjustment of the various homogenizing coil sets.

Another feature of the present invention is the same as any one or more of the preceding features wherein the coil set comprises a plurality of coaxially aligned coil segments with their centers axially spaced to form a generally solenoidal shaped array of coils energized with different ampere turns to produce the asymmetric field homogenizing component over a portion of the field region to be corrected and located inside said solenoidal shaped array, whereby the coil set is especially useful for correcting fields produced by solenoids, including superconductive solenoids.

Another feature of the present invention is the provision of a coil set for producing an asymmetric homogenizing field component over only a portion of the region of field to be corrected and wherein the coil set comprises an array of coplanar elongated rectangular coil segments with the centers of the separate coil segments being spaced apart along a line in the plane and normal to the direction of elongation of the coil segments and energized with current to produce an homogenizing field component, whereby the coil set is especially useful for correcting fields produced between planar pole pieces of a magnet.

Another feature of the present invention is the same as any one or more of the preceding features wherein the coil sets are employed in combination with a gyromagnetic resonance spectrometer for improving the uniformity of the magnetic field over the gyromagnetic resonance sample volume, whereby homogenizing the magnetic field for the spectrometer is simplified.

Figure 10:
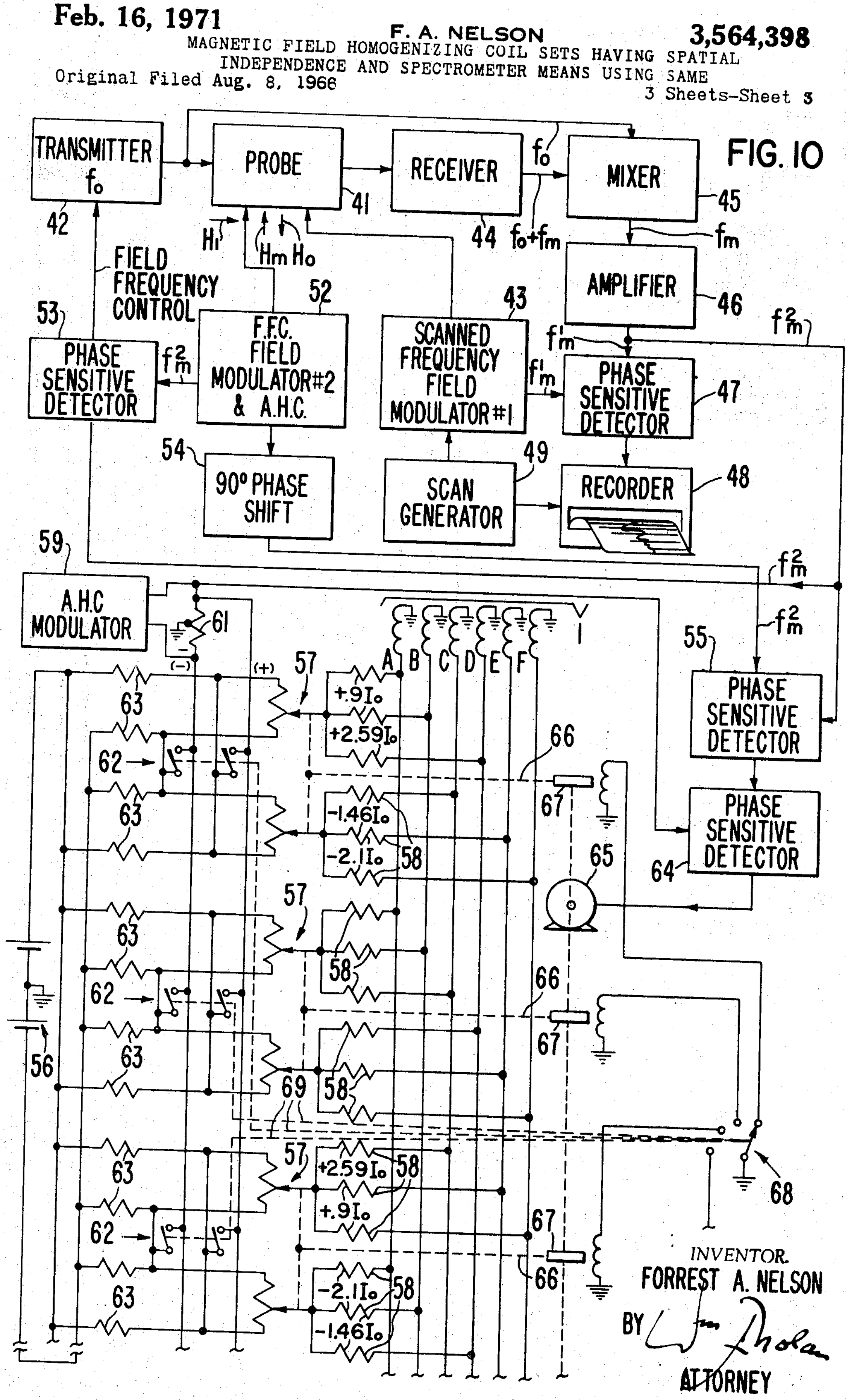

Other features and advantages of the present invention will become apparent upon a perusal of the following specification taken in connection with the accompanying drawings wherein:

FIG. 1 is a schematic diagram of a gyromagnetic resonance sample immersed in a magnetic field produced by a solenoid and including a set of magnetic field homogenizing coils, FIG. 2 is a plot of axial magnetic field intensity $H_z$ versus distance along the Z direction corresponding to various field homogenizing conditions, FIGS. 2A and 2B are expanded and simplified diagrams of portions of the plot of FIG. 2 delineated by lines AA and BB, FIG. 3 is a gyromagnetic resonance line signal for various conditions of field uniformity within the sample volume as indicated by FIGS. 2–2B, FIG. 4 is a plot of axial magnetic field intensity $H_z$ in the Z direction versus distance in the Z direction for a coil set of the present invention, FIGS. 4A and 4B are expanded and simplified diagrams of portions of the plot of FIG. 4 delineated by lines AA and BB, FIG. 5 is a plot of relative magnetic field strength in the Z direction versus distance from the median Z plane of the coil set for a certain ratio of currents in the field corrective coils of FIG. 1, FIG. 6 is plot of $H_z$ produced by a set of field homogenizing coils which are depicted along the base line versus distance away from the median plane of the sample in either the X or Y direction, FIG. 7 is a perspective view of a coil set of the type depicted in FIG. 6 as arranged for use between the planar poles of a magnet, FIG. 8 is an alternative coil arrangement to that shown in FIG. 6, FIG. 9 is a perspective view of a coil set of the type shown in FIG. 8 as arranged for use between the pole of a magnet, and FIG. 10 is a schematic diagram, partly in block diagram form, of a gyromagnetic resonance spectrometer employing the coil sets of the present invention.

Referring now to FIG. 1 there is shown a set of field homogenizing coils 1, each coil identified by a different letter A–F. The coils 1 serve to produce field components which cancel residual inhomogeneities in the axial magnetic field $H_z$ produced by a solenoid 2. A gyromagnetic resonance sample 3, for example water, is contained within a sample vial 4 as of glass. The vial 4 is preferably located on the axis of both the solenoid 2 and field corrective coils 1. A gyromagnetic resonance exciting and detecting coil 5 is oriented at right angles to the axial field $H_z$ for producing an alternating magnetic field $H_1$ at the gyromagnetic resonance frequency within a central region 6 of the sample 3 and at right angles to the polarizing magnetic field $H_z$. This central region 6 of the sample 3 which is typically cylindrical or spherical is the region of field to be corrected since field inhomogeneities outside of this strongly R.F. coupled to region of the sample are unimportant for gyromagnetic resonance spectroscopy.

Referring now to FIG. 3 there is shown by curve 7 the typical single gyromagnetic resonance line shape in the presence of residual field inhomogeneities within the sample region 6. One of the possible inhomogeneities within the sample region 6 is a curvature gradient of the type shown by line R of FIG. 2. This gradient is symmetric to magnet by asymmetric if the sample 6 is not in the center of the magnet, which is often the case. A typical prior art homogenizing field component for cancelling the residual curvature gradient R is as shown by the solid line $C^1$. Typically such a prior corrective component $C^1$ is symmetric with respect to the sample region 6. However, this prior symmetric homogenizing field $C^1$ does not appreciably narrow the resonance line shape. The resultant field $C^1+R$ is shown in greater detail in FIG. 2A. The gyromagnetic bodies, for example, nuclei in higher than center field values one side of the median plane of the sample 6 "see" an increased magnetic field intensity as shown by dotted line $(C^1+R)$ of FIGS. 2A and 3. On the other hand, the nuclei on the other side of the sample "see" a decreased field intensity, as shown by line $(C^1+R)$ of FIGS. 2A and 3. As a result of the prior art field correction the resonance line signal height is not changed appreciably. Therefore, the operator obtains an ambiguous result from the adjustment of this prior art field correction and does not know how to adjust the coils to obtain optimum field uniformity (homogeneity).

Alternatively, the operator could have adjusted his curvature gradient correction coil set to produce a field component indicated by line $C^2$ of FIG. 2. In this case as shown in FIGS. 2 and 2B the nuclei on the higher than center value of the field "see" a reduced field $(C^2+R)$ thereby sharpening up the trailing edge of the resonance line as indicated by line $(C^2+R)$. However an equal number of the nuclei on the low field side of the sample region 6 "see" a decreased field intensity as clearly shown by FIG. 2B. The result is an equal number of nuclei on the leading edge of the resonance line are moved out from the center of the line. Again no appreciable change in resonance line height is obtained by adjustment of the prior art coils.

Referring now to FIG. 4 there is shown a plot of magnetic field intensity $H_z$ versus distance from the medium plane of the sample depicting the operation of the coil set of the present invention. More particularly, the coil set, the geometry of which will be described below, produced a homogenizing corrective field component on only one side of the median plane of the sample region 6, as shown by line $C_1$. A uniform field component, not a gradient component, is produced on the other side of the median plane of the sample 6. Assuming the same residual gradient R as for the plot of FIG. 2, the nuclei on the high field side of the median plane of the sample "see" a reduced field intensity $(C_1+R)$, as shown in FIG. 4A, whereas the nuclei on the other side of the center of the sample "see" no change in the residual gradient R. As a result, some of the nuclei on the high field side of the resonance line are moved in under the center of the resonance line to produce a substantial increase in the peak height as shown by line $(C_1+R)$ of FIG. 3. The low field side of the sample does not "see" a change. Thus, it is seen that this type of a spatially independent correction, operable over only one side or portion of the sample volume 6, produces an unambiguous change in the amplitude of the resonance line signal.

A second similar coil set of the present invention described below, produces a second field homogenizing component $C_2$, see FIG. 4. The resultant field $(C_2+C_1+R)$ is shown in detail in FIG. 4. With this resultant field the nuclei on the low field side of the sample "see" a homogenized field and as a consequence are moved in under the center of the resonance line as indicated by line $(C_2+C_1+R)$ of FIG. 3, whereas the high field side of the resonance line remains as improved by the other coil set and indicated by line $(C_1+R)$. The result is another substantial increase in the peak height of the resonance line, thereby giving another unambiguous change in the field uniformity as detected by changes in the resonance signal line height.

Referring now to FIG. 5 there is shown a magnetic field intensity plot versus distance from the median plane in inches for a field corrective coil set of the present invention as produced by a certain excitation of the coils A–F of the coil set 1 of FIG. 1. There are 6 equally spaced coils A–F each 0.200″ in length with 0.160″ axial spacing between adjacent coils A–F with each coil having an equal number of turns. The corrective field component as shown by line 15 is produced when coils A–F are energized with relative currents as follows: A=+0.9, B=+0.9, C=−1.46, D=+2.59, E=−2.1, and F=−2.1, where plus is the direction of current in the coil to produce an axial magnetic field component $H_2$ which is magnetically aiding to the axial field $H_z$ produced by the solenoid 2. As seen from the plot of FIG. 5 the homogenizing field component is asymmetric and spatially independent on opposite sides of the median plane of the sample region 6. A curvature field component is produced on the D coil side of the median plane while substantially no homogenizing is produced on the C coil side of the median plane of the sample. This sample region 6 is about 0.280″ in length and the coils A–F are about 0.75″ in diameter.

The same curvature field correcting component is produced on the C coil side without producing an interfering homogenizing component on the previously corrected D coil side of the sample 6 by superimposing the same relative currents on the same coil set 1 as follows: A=−2.1, B=−2.1, C=+2.59, D=−1.46, E=+0.9 and F=+0.9. This arrangement will produce the spatially independent field corrective curvature component on the C coil side of the sample without producing an interfering homog-the C coil side of the median plane of the sample. The latter set of currents is superimposed upon the first set of currents in the coils A–F by conventional means described below with regard to FIG. 10 and as described and claimed in U.S. application 442,000 filed Mar. 23, 1965 and assigned to the same assignee as the present invention.

Referring now to FIG. 6 there is shown an alternative embodiment of the field homogenizing coils of the present invention which is especially useful for correcting the field in the gap between parallel planar pole pieces of a magnet. More particularly, the field corrective coils 17 are arranged to be substantially coplanar and of generally rectangular plan view with the major axis of the rectangles being normal to the direction for which the field is being homogenized.

A first coil 18 of the set 17 produces a corrective field as shown by line 19. Within the sample region 6 this correction is asymmetric but includes a smaller field portion 21 on one side of the sample region 6 which is not uniform. This smaller field portion is compensated (reduced to zero) by a smaller coil 22 which bucks out the tail portion 21 of the field produced by the main coil 18 to produce a composite field curve 23 which is uniform and preferably zero on coil 22's side of the median plane of the sample 6 and which has a desired curvature component on coil 18's side of the sample. The same spatially independent homogenizing component 23 is produced on the other side of the sample 6 by providing coils 18′ and 22′. When the residual curvature field component is being corrected in the X direction the major axes 20 for the coils 18 and 22 are the Y axes. When the residual curvature component is being corrected in the Y direction the major axes for the coils 18 and 22 are the X axes.

Referring now to FIG. 7 the coil set 17 is shown as arranged in the gap 24 of a magnet, not shown, inbetween a pair of planar pole pieces 25.

Referring now to FIG. 8, there is shown an alternative embodiment to the coil set 17 of FIG. 6. In this embodiment, a coil set 27 includes a first and second set 28 and 28′ of three elongated rectangular coils 29, 31, and 32. The three coils 29, 31, and 32 are arranged in spaced relationship with their centers displaced in a direction normal to their major axes 20, as was the case for the coils of the set 17 of FIG. 6. However, in this case the coils 29, 31, and 32 overlap their neighbor to produce a composite field correction as shown by line 33. The field correction 33 is uniform within the sample region 6 on one side of the median plane of the sample and provides the desired curvature homogenizing field component on the other side of the sample. However, in this case the uniform field component is not of zero amplitude and, thus, introduces a substantial change in the average field intensity. This change in the average field is easily compensated by a field-frequency control as explained with regard to FIG. 10 below or by use of an auxiliary coil portion connected with the other coils to produce a uniform component over the sample 6 which subtracts the uniform field portion of the corrective component. The same or a similar spatially independent homogenizing magnetic field component 33 is produced on the other side of the median plane of the sample 6 by energizing the other coil set 28′, which may include coil 29 as one of its coils and, thus, comprises coils 32′, 31′ and 29.

Referring now to FIG. 9 there is shown the coil set 27 of FIG. 8 as arranged for cancelling residual field inhomogeneities in the magnetic field produced in the gap 24 between the pair of planar pole pieces 25. The coil set 27 is preferably substantially coplanar with the mutually opposed faces of the pole pieces 25.

Referring now to FIG. 10 there is shown a gyromagnetic resonance spectrometer system employing the coil sets of the present invention. A sample of gyromagnetic material to be analyzed is inserted within a probe assembly 41 and immersed in a polarizing magnetic field $H_o$ such as that produced by the solenoid 2 of FIG. 1. A transmitter 42 supplies an alternating magnetic field $H_1$ to the sample region 6 at right angles to the polarizing field $H_o$ via the intermediary of transmitter coil 5, see FIG. 1. A scanned field modulator 43 superimposes upon the polarizing magnetic field an alternating magnetic field $H_m$ to modulate the polarizing field intensity at a convenient low frequency $$f^1{}_m$$

such as 10 kHz. Gyromagnetic resonance of the sample is obtained when the transmitter frequency $f_o$ plus the field modulation frequency $$f^1{}_m$$

is equal to the gyromagnetic resonance frequency of the sample under analysis.

The resonance signal is picked up by a conventional pickup coil within the probe 41, not shown, and fed to the input of a radio frequency receiver 44 wherein it is amplified and fed to one input of a mixer 45. The mixer 45 mixes the resonance signal at $$f_o+f^1{}_m$$

with a sample of the transmitter signal at $f_o$ to produce a difference frequency resonance signal at $$f^1{}_m$$

The resonance signal is amplified by low frequency amplifier 46 and fed to one input of a phase sensitive detector 47 wherein it is phase detected against the field modulation frequency $$f^1_m$$

to produce a D.C. resonance output signal which is recorded by recorder 48.

The field modulation frequency $$f^1_m$$

is scanned by a scan generator 49 to scan through a spectrum of the sample under analysis. In a preferred embodiment, the resonance output signal is recorded as a function of the scan output of the scan generator 49.

The spectrometer also includes a field frequency control channel loop. A sample material having a strong single resonance line such as that produced by tetramethylsilane (TMS) is intermixed with the sample under analysis to provide a strong resonance line outside of the spectrum under analysis. A second field modulator 52 modulates the polarizing magnetic field at a frequency $$f^2_m$$

such that the transmitter frequency $$f_o+f^2_m$$

is equal to the resonant frequency of the TMS line. This second modulation frequency $$f^2_m$$

appears as a resonance signal at the output of the low frequency amplifier 46 and is fed to one input of a second phase sensitive detector 53 for comparison with a sample of the second field modulation signal. The output of the second phase sensitive detector 53 is a D.C. dispersion mode signal which is fed back to the transmitter 42 to control the frequency $f_o$ of the transmitter 42 to maintain resonance of the TMS sample.

An automatic field homogeneity control (AHC) channel loop is also provided. This function is performed by feeding a sample of the field frequency control modulation at $$f^2_m$$

as derived from the field frequency modulator 52 to a 90° phase shifter 54. A third phase sensitive detector 55 serves to compare the low frequency TMS resonance signal at $$f^2_m$$

with the phase shifted output of the field modulator at $$f^2_m$$

to produce an absorption mode (AHC) D.C. resonance signal for automatic field homogeneity control.

The residual gradient cancelling coil set 1 is energized with the relative currents, as described above, from a current supply 56 via the intermediary of pairs of ganged potentiometers 57 connected in parallel across the current supply 56, one potentiometer producing positive current and the other negative current. Relative current determining resistors 58 are connected in series between the potentiometer 57 and the individual coils A–F.

A current modulator 59 has its output connected across a grounded centertapped load resistor 61 to provide an equal positive and negative modulation current output. This output is selectively superimposed upon the inputs of the potentiometers 57 via switches 62. Isolating resistors 63 are connected between the potentiometers 57 and the current supply 56 for preventing the modulation applied across the input of one of the potentiometers 57 from inadvertently leaking into the inputs of the other potentiometers 57.

The modulation frequency of modulator 59 is preferably very low on the order of a few Hz. The modulation which is superimposed upon the coil set 1 is equal in effect to a minute change in the setting of the particular potentiometer which is being modulated and, thus, corresponds to a modulation of the field homogeneity correction controlled by the subject potentiometer. This modulation of the homogenizing component will produce a modulation in the amplitude of the resonance signal obtained from the automatic homogeneity control (AHC) sample. A sample of the homogeneity modulation signal, as derived from the modulator 59, is phase sensitive detected against the absorption mode resonance signal of the AHC sample in a fourth phase sensitive detector 64. The output is a D.C. signal of a phase dependent upon the sense and degree the homogenizing field component departs from the optimum. This output is then fed to a D.C. motor 65 which has its output shaft selectively coupled to the selected potentiometer shaft 66 via magnetic clutches 67 which are selectively energized via a control switch 68 which is ganged via mechanical linkages 69 to the various modulation switches 62.

After each one of the field homogenizing potentiometers 57 is, thus, automatically adjusted for optimum homogeneity, control switch 68 is switched to another potentiometer 57 for optimizing the adjustment of that homogenizing component produced by that potentiometer and so on and so forth. The process is continuously repeated to maintain optimum field uniformity and resolution of the spectrum of the sample under analysis.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for improving the uniformity of a region of magnetic field to be corrected including, means forming a first coil circuit, means forming a second coil circuit separately energizable with respect to said first coil circuit, means for energizing said first coil circuit with a variable current, means for energizing said second coil circuit with a current which is separately variable relative to the current energization of said first coil circuit, said first and second coil energizing means energizing said first and second coil circuits such as to produce first and second separate asymmetric distributions of current relative to the certain region of magnetic field to be corrected and to produce first and second separately variable homogenizing magnetic field gradient components substantially confined to separate portions of the region of field to be corrected for cancelling certain residual inhomogeneities in the separate portions of the region of field to be corrected, each one of said first and second coil circuits including a plurality of coils with their centers spaced apart in a direction which defines the direction of the homogenizing field gradient component being produced, and said coils being energized with different ampere turns to produce the asymmetric homogenizing field gradient corrective component, said coils having their centers coaxially aligned and axially spaced to form a generally solenoidal shaped array of coils, and wherein the energizing currents in the various coils are relatively proportioned to produce said homoegnizing magnetic field gradient components within the respective spatially independent portions of the region of field being corrected, whereby said field gradient homogenizing components are spatially independent to prevent mutual interference of their adjustment and whereby the adjustments produce unambiguous corrections of the field gradients when sensed by gyromagnetic resonance of a sample within the region of field being corrected.

2. The apparatus of claim 1 including in combination, means for immersing an ensemble of gyromagnetic bodies within the region of magnetic field to be corrected, means for exciting gyromagnetic resonance of the bodies, means for detecting resonance of the bodies to produce a resonance line signal, and means for detecting changes in the height of the resonance line signal as a function of changes in the applied homogenizing field components to indicate whether the uniformity of the magnetic field is improved for a certain change in the applied homogenizing component.

3. Apparatus for improving the uniformity of a region of magnetic field to be corrected including, means forming a first coil circuit, means forming a second coil circuit separately energizable with respect to said first coil circuit, means for energizing said first coil circuit with a variable current, means for energizing said second coil circuit with a current which is separately variable relative to the current energization of said first coil circuit, said first and second coil energizing means energizing said first and second coil circuits such as to produce first and second separate asymmetric distributions of current relative to the certain region of magnetic field to be corrected and to produce first and second separately variably homogenizing magnetic field gradient components substantially confined to separate portions of the region of field to be corrected for cancelling certain residual inhomogeneities in the separate portions of the region of field to be corrected, each one of said first and second coil circuits including a plurality of coils with their centers spaced apart in a direction which defines the direction of the homogenizing field gradient component being produced, and said coils being energized with different ampere turns to produce the asymmetric homogenizing field gradient corrective component, said coils being rectangular and coplanar with the centers of the coils being spaced apart along a line in the plane of the coplanar coils, and wherein the energizing currents in the various coils of each coil circuit are relatively proportioned to produce said homogenizing magnetic field gradient component within the respective spatially independent portions of the region of field being corrected, whereby said field gradient homogenizing components are spatially independent to prevent mutual interference of their adjustment and whereby the adjustments produce unambiguous corrections of the field gradient when sensed by gyromagnetic resonance of a sample within the region of field being corrected.

4. The apparatus of claim 3 including in combination, means for immersing an ensemble of gyromagnetic bodies within the region of magnetic field to be corrected, means for exciting gyromagnetic resonance of the bodies, means for detecting resonance of the bodies to produce a resonance line signal, and means for detecting changes in the height of the resonance line signal as a function of changes in the applied homogenizing field components to indicate whether the uniformity of the magnetic field is improved for a certain change in the applied homogenizing component.

References Cited

UNITED STATES PATENTS

| | | | |
|---|---|---|---|
| 2,858,504 | 10/1958 | Nelson | 324—0.5 |
| 3,199,021 | 8/1965 | Anderson | 324—0.5 |
| 3,287,630 | 11/1966 | Gang | 324—0.5 |
| 3,419,904 | 12/1968 | Weaver | 324—0.5 |

FOREIGN PATENTS

| | | | |
|---|---|---|---|
| 884,129 | 1961 | Great Britain | 324—0.5 |

MICHAEL J. LYNCH, Primary Examiner

U.S. Cl. X.R.

317—123